US011884457B2

(12) United States Patent
Whalen et al.

(10) Patent No.: US 11,884,457 B2
(45) Date of Patent: Jan. 30, 2024

(54) STORAGE SOLUTION HAVING A UTILITY BOX, LATCH SYSTEM, RACK SYSTEM OR DISPLAY SYSTEM (71) Applicant: Plano Molding Company, LLC, Plano, IL (US)

(72) Inventors: John Whalen, Sheridan, IL (US);
Clark McCune, Roanoke, TX (US);
Emily Stokes, Columbus, OH (US);
Neil Kwiatowski, Queens, NY (US);
Mason Umholtz, Sunnyvale, CA (US);
Michael Day, New York, NY (US);
Charles Paradise, Brooklyn, NY (US);
Gregory Howe, Boston, MA (US);
James Krause, Astoria, NY (US)

(73) Assignee: Plano Molding Company, LLC, Plano, IL (US)

( * ) Notice: Subject to any disclaimer, the term of this patent is extended or adjusted under 35 U.S.C. 154(b) by 0 days.

(21) Appl. No.: 16/871,385

(22) Filed: May 11, 2020

(65) Prior Publication Data
US 2020/0354117 A1 Nov. 12, 2020

Related U.S. Application Data (60) Provisional application No. 62/845,615, filed on May 9, 2019.

(51) Int. Cl.
*B65D 43/22* (2006.01)
*B65D 43/16* (2006.01)
*B65D 51/24* (2006.01)

(52) U.S. Cl.
CPC ........... *B65D 43/22* (2013.01); *B65D 43/163* (2013.01); *B65D 51/245* (2013.01)

(58) Field of Classification Search
CPC .............................. B65D 43/22; B65D 45/16; B65D 2251/1058; B25H 3/02
USPC ............ 220/324, 325; 292/358, 285; 70/162
See application file for complete search history.

(56) References Cited

U.S. PATENT DOCUMENTS

| 5,193,706 A | 3/1993 | Hanna et al. |
| 5,395,019 A | 3/1995 | Christensen |
| 7,717,256 B1 * | 5/2010 | Jensen ..................... G07B 3/00 206/229 |
| 9,375,835 B1 * | 6/2016 | Lin ......................... B25H 3/02 |
| 2002/0079313 A1 * | 6/2002 | Grayson ................ A01K 97/06 43/57.1 |
| 2002/0117507 A1 * | 8/2002 | Doerfler .................. E05C 19/06 220/835 |
| 2003/0111476 A1 * | 6/2003 | Serio, Jr. ............... A45C 13/008 220/745 |
| 2006/0186003 A1 * | 8/2006 | Dost .................. A45C 13/1084 206/349 |

(Continued)

FOREIGN PATENT DOCUMENTS

KR 20110080191 7/2011

OTHER PUBLICATIONS

International Search Report and Written Opinion issued in PCT/US2020/031863, dated Aug. 19, 2020.

*Primary Examiner* — Robert Poon
(74) *Attorney, Agent, or Firm* — Husch Blackwell LLP (57) ABSTRACT A storage solution that provides substantial advantages over existing storage solutions. The storage solution can include a latch system, a rack system or a display system, any one or more of which can be included with a utility box.

11 Claims, 12 Drawing Sheets (56) References Cited

U.S. PATENT DOCUMENTS

| | | | | |
|---|---|---|---|---|
| 2009/0114646 A1* | 5/2009 | Whalen | ............... | A45C 13/008 |
| | | | | 220/780 |
| 2009/0114653 A1* | 5/2009 | Schenker | ............... | B65D 25/32 |
| | | | | 220/789 |
| 2010/0012538 A1* | 1/2010 | Brunner | .................... | E05C 3/30 |
| | | | | 206/373 |
| 2011/0113615 A1* | 5/2011 | Cho | ........................ | A45C 5/02 |
| | | | | 29/527.1 |
| 2013/0127183 A1* | 5/2013 | Chang | ...................... | B25H 3/02 |
| | | | | 292/202 |
| 2014/0251998 A1* | 9/2014 | Kinskey | .................. | E05C 19/10 |
| | | | | 292/95 |
| 2017/0197765 A1* | 7/2017 | Hu | ..................... | B65D 25/2852 |
| 2019/0168376 A1* | 6/2019 | Brocket | ................ | B25H 3/028 |

* cited by examiner

STORAGE SOLUTION HAVING A UTILITY BOX, LATCH SYSTEM, RACK SYSTEM OR DISPLAY SYSTEM

CROSS-REFERENCE TO PRIOR APPLICATION

This application claims priority to and the benefit thereof from U.S. Provisional Patent Application No. 62/845,615, filed May 9, 2019, titled "Storage Solution with a Utility Box, Latch System, Rack System or Display System," the entirety of which is hereby incorporated herein by reference.

FIELD OF THE DISCLOSURE

The disclosure relates generally to a storage solution for storing articles such as fishing tackle, bait, equipment or tools.

SUMMARY OF THE DISCLOSURE

A storage solution is disclosed that provides substantial advantages over existing storage solutions. The storage solution can include a latch system, a rack system or a display system, any one or more of which can be included with a utility box.

According to an aspect of the disclosure, a utility box with a one-handed latch system is provided. The utility box comprises a top, a base having a latch catch, and a latch device having a latch cover that is connected to the top and configured to engage the latch catch and lock the utility box from an open position to a closed position in two stages of operation. The utility box can comprise a display device that displays an identification for contents in the utility box. The utility box can comprise a rack system that attaches to a surface to secure the utility box to the surface. The surface can be a top surface or a bottom surface of another utility box.

The latch cover can include a latch that engages the latch catch to lock the utility box in the closed position.

The latch device can include a knuckle member having a first end that can connect pivotally to the latch cover. The knuckle member can have a second end that can connect pivotally to the top.

The display device can be located in the latch cover. The display device can comprise an overmold formed in the latch cover.

The rack system can comprise a rack base that attaches to the surface or the utility box. The rack base can include a box catch. The rack system can include a rail feature that is formed in the utility box. The rail feature can be formed in the base or the top of the utility box. The rail feature can engage the box catch to secure the utility box to the rack base.

According to a further aspect of the disclosure, a utility box is provided having a top, a base with a latch catch, and a latch device having a latch cover that is connected to the top or the base, wherein the latch device includes a display device that displays an identification for contents in the utility box.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description and drawings that follows.

DETAILED DESCRIPTION OF THE DISCLOSURE

The embodiments of the disclosure and the various features and advantageous details thereof are explained more fully with reference to the non-limiting embodiments and examples that are described or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

A utility box can be made in any shape, size, finish, color or material. The utility box can store articles such as, for example, bait, crankbait, tackle, weights, floats, tools, or any other item that might be useful to the user. The utility box can include a latch system to close and secure the utility box in a closed position. The latch system can be configured for single hand operation, including unlatching and opening a cover of the utility box or closing the cover and latching the cover shut without needing to release the latch at any point during the entire opening or closing operation. The latch system can be affixed permanently or removably to the utility box, or the latch system (or a portion thereof) can be formed integrally with the utility box. The latch system can include a single latch that covers a pair of latching points.

The utility box with latch system provides a significant improvement and advantages over existing storage solutions. Existing storage solutions typically include multiple latch mechanisms—generally two at each front corner and one each end for a total of four mechanisms. These multiple latch points sometimes make it difficult to open a storage box to retrieve articles inside when space and hands are limited. Most times a user is holding something else in one hand and trying to retrieve an article out of the storage box with the other hand.

The utility box can include a rack system that allows for vertical and/or horizontal stacking and securement of two or more utility boxes. The rack system can include a rack base that can attach to or be formed as part of a surface. The rack system can include a rail feature or a rack head having a rail feature. The rail feature can be formed in a portion of the utility box. The rack head can attach to or be formed as part of a utility box. The rail features can be formed in a base or a top of a utility box, such as, for example, on the sides of the utility box base to allow the utility box to slide onto the rack base, thereby enabling a user to stack and organize multiple utility boxes in a shelf like manner. The rack system gives a user the ability to access a bottom utility box in a stack of utility boxes in an efficient manner, while the utility boxes can remain in a column (or row) stack. The rack system enables a user to move multiple utility boxes at once in a bundled manner as well as maintain visibility of the utility boxes all facing the same direction in vertical (or horizontal) fashion.

The utility box can include a display system. The display system can be positioned on a portion of a latch system for easy access or reference. The display system can provide a way to label the contents of the utility box in an easily visible area, while also enabling relabeling when used for storing different articles. The display system provides a significant improvement and advantages over existing labeling solutions that use separate snap-on-clear plastic covers to retain paper labels or paper labels with adhesive backing that are applied directly to the utility box. The existing solutions contain small parts that can be lost or broken, and paper labels can be easily damaged by moisture. The display system overcomes those problems.

Figure 1:
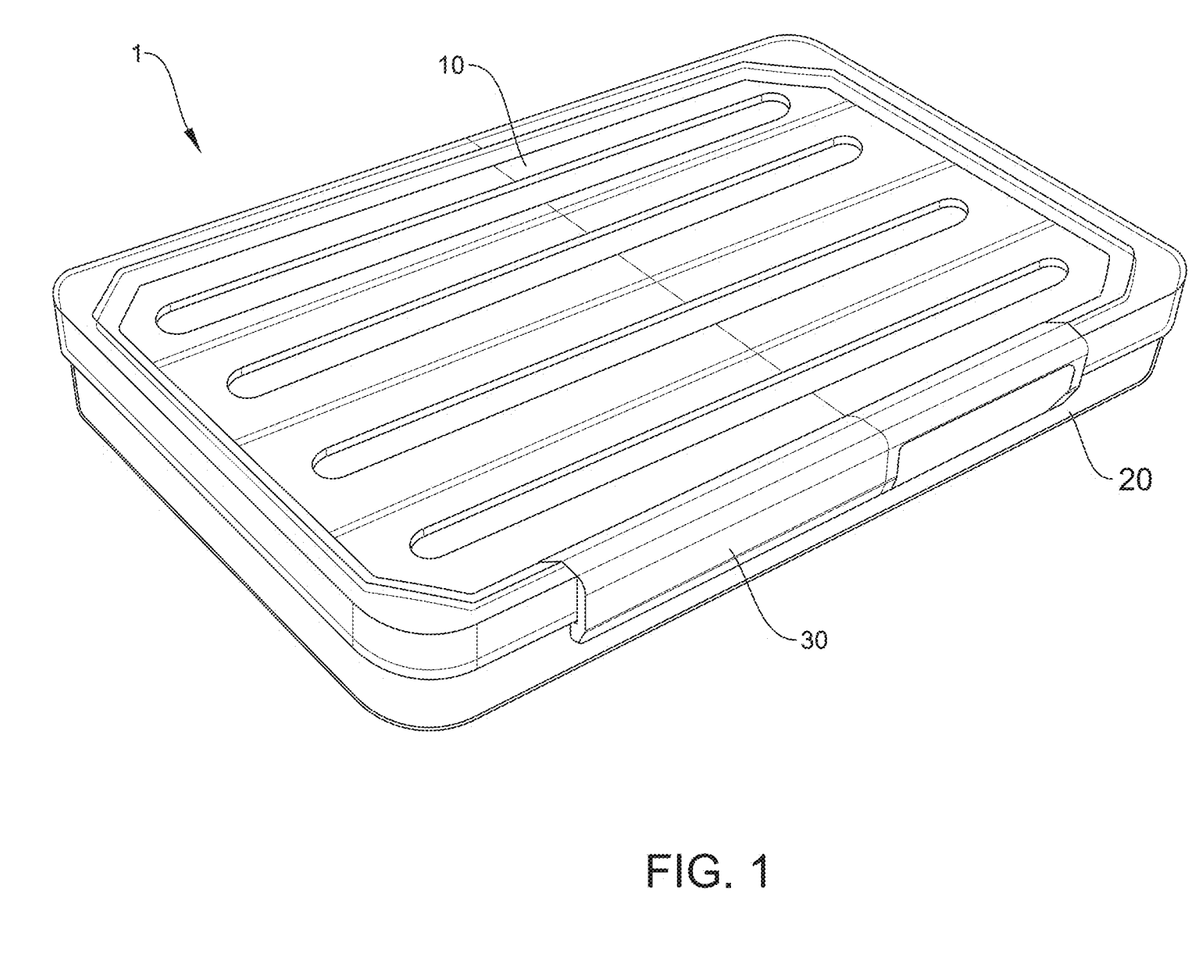
FIG. 1 shows an embodiment of a utility box.

FIG. 1 shows a non-limiting embodiment of a utility box 1 that is constructed according to the principles of the disclosure. The utility box 1 can include a top 10, a base 20, and a latch device 30. The utility box 1 can include a front portion, a back portion, a top portion, a bottom portion, and a pair of side portions. The top 10 can close and secure any articles in the utility box 1 when in the closed position (shown in FIG. 1), thereby holding the articles in the utility box 1. The utility box 1 can be made in any shape, size, finish, color or material. The top 10 or the base 20 can include a transparent material, so that articles in the utility box 1 can be viewed without having to open the top 10.

Figure 2:
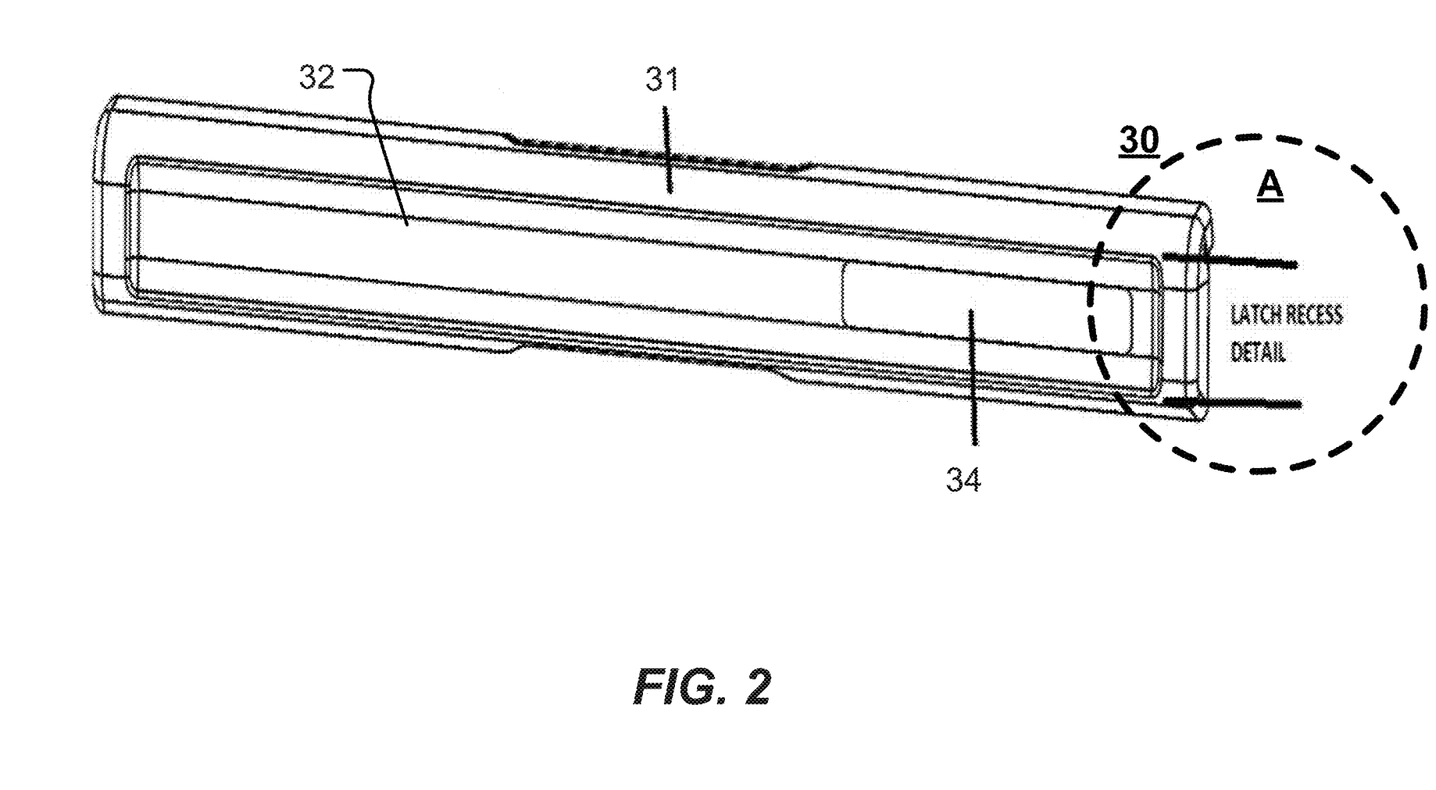
FIG. 2 shows an overview of an embodiment of a latch system.

FIG. 2 shows an embodiment of the latch system that is constructed according to the principles of the disclosure. The latch system comprises a latch device 30 that can be permanently or removably attached to, or partially or entirely formed integrally with the utility box 1 (shown in FIG. 1). The latch device 30 includes a two-stage latch system. The latch device 30 can include a latch cover 31. In a first stage, a first end portion of the latch cover 31 can be moved away from the cover 10 (shown in FIG. 1); and, in a second stage, a second end portion of the latch cover 31, opposite the first end portion, can be moved away from the base 20 (shown in FIG. 1). The latch cover 31 can include a latch cover surface 32. The latch cover 31 can include a display device 34.

The display device 34 can include an attachable structure that can be permanently or removably affixed to or formed integrally with the latch cover 31. The display device 34 can include a label surface. The display device 34 can include an over-molded label surface. The display surface can be recessed into the latch cover 31, thereby protecting the surface from being scratched or rubbed during use (shown in FIG. 3), which could result in unintended erasure or smudging of any writing on the display surface where the display device 34 is provided with a writeable or erasable surface.

According to a non-limiting embodiment of the disclosure, the latch cover 31 can be made of a material such as acrylonitrile butadiene styrene (ABS) for durability, while the display device 34 can be made of a material such as polypropylene or other material that is capable of being written on with a permanent marker, but also allows the dried ink to be wiped off and the display surface relabeled as a user sees fit.

Figure 3:
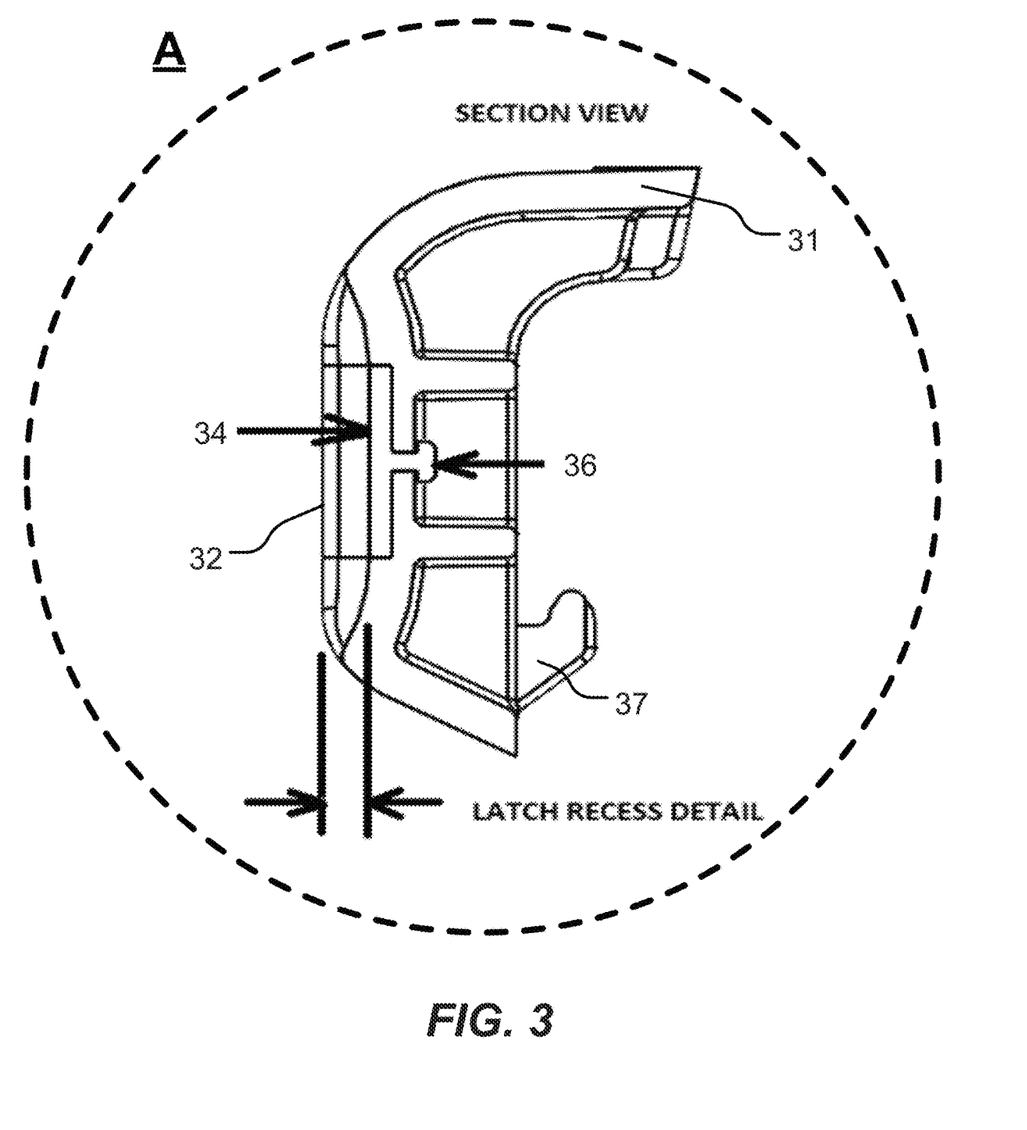
FIG. 3 shows a cross-section cut view of a portion of the latch system in FIG. 2.

FIG. 3 shows a cross-section cut view of a portion A of the latch device 30 (shown in FIG. 2). The latch device 30 can include a latch 37. The latch cover 31 can include an aperture that can, for example, receive a portion 36 of the display device 34 to secure the display device 34 to the latch cover 31. As noted earlier, the latch cover 31 can be formed integrally with the display device 34. As seen in FIG. 3, the latch cover 31 can include a recess in the display surface 32, proximal to the display device 34, to protect the surface of the display device 34 from unintended contact during use.

Figure 4:
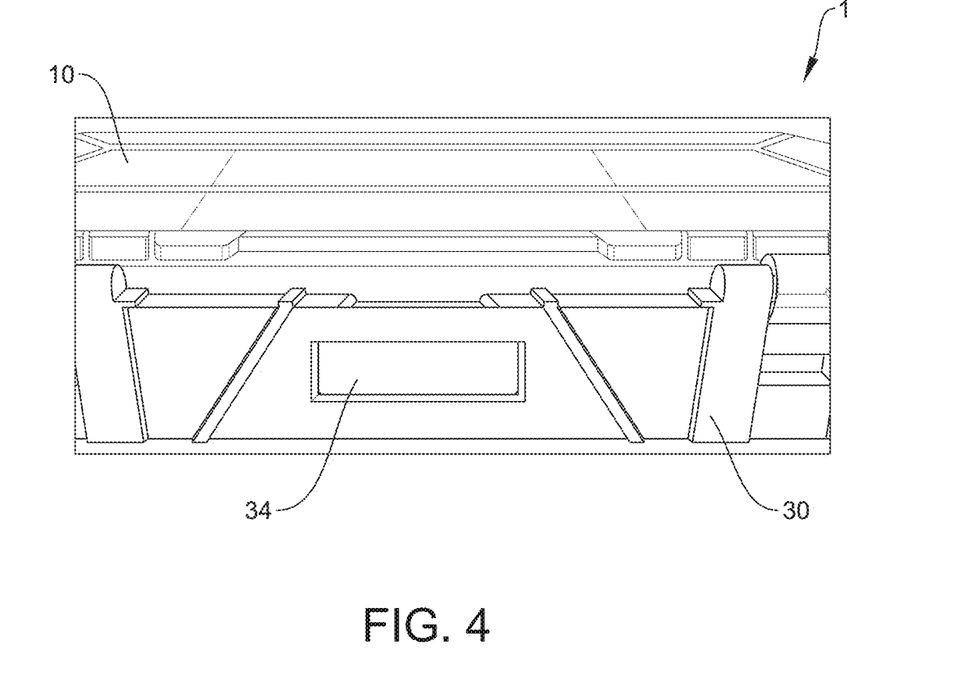
FIGS. 4 and 5 show an embodiment of a display system.
Figure 5:
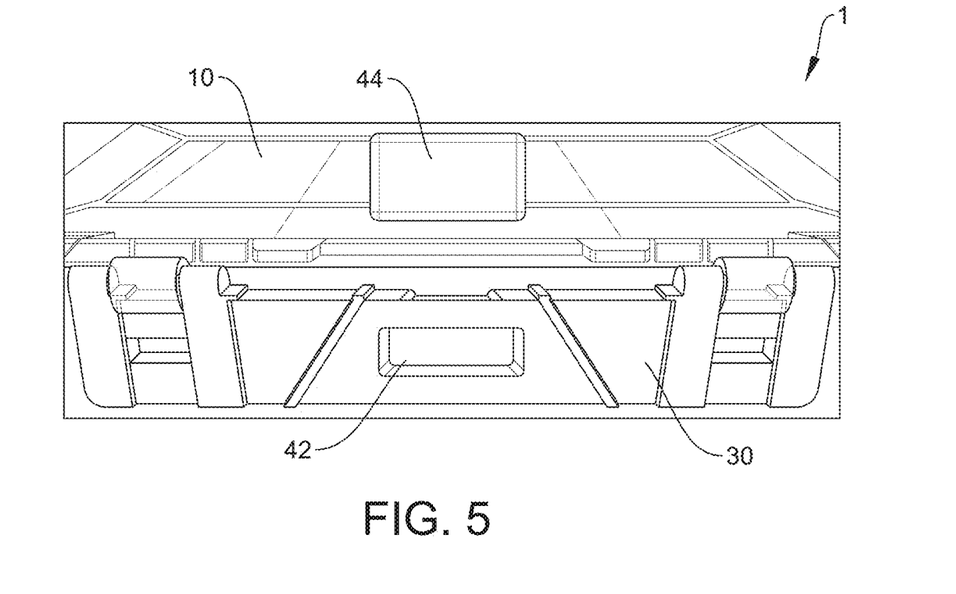

FIGS. 4 and 5 show another embodiment of the display device 34, according to the principles of the disclosure. As seen in FIGS. 4 and 5, the display device 34 can include a receiver 42 and a removable display 44. The receiver 42 can be configured to receive and hold the display 44. The receiver 42 can include a recess and an opening through which the display 44 can be inserted and securely seated in the recess. The display 44 can include a device such as, for example, a plate, a chip, a strip, a sheet, or any other structure that can be written on or a label affixed to identify the contents of the utility box. Alternatively, the display 44 can include an electronic display device (not shown) that can be inserted into the receiver 42 or affixed to the latch cover 31 (shown in FIG. 2).

Figure 6:
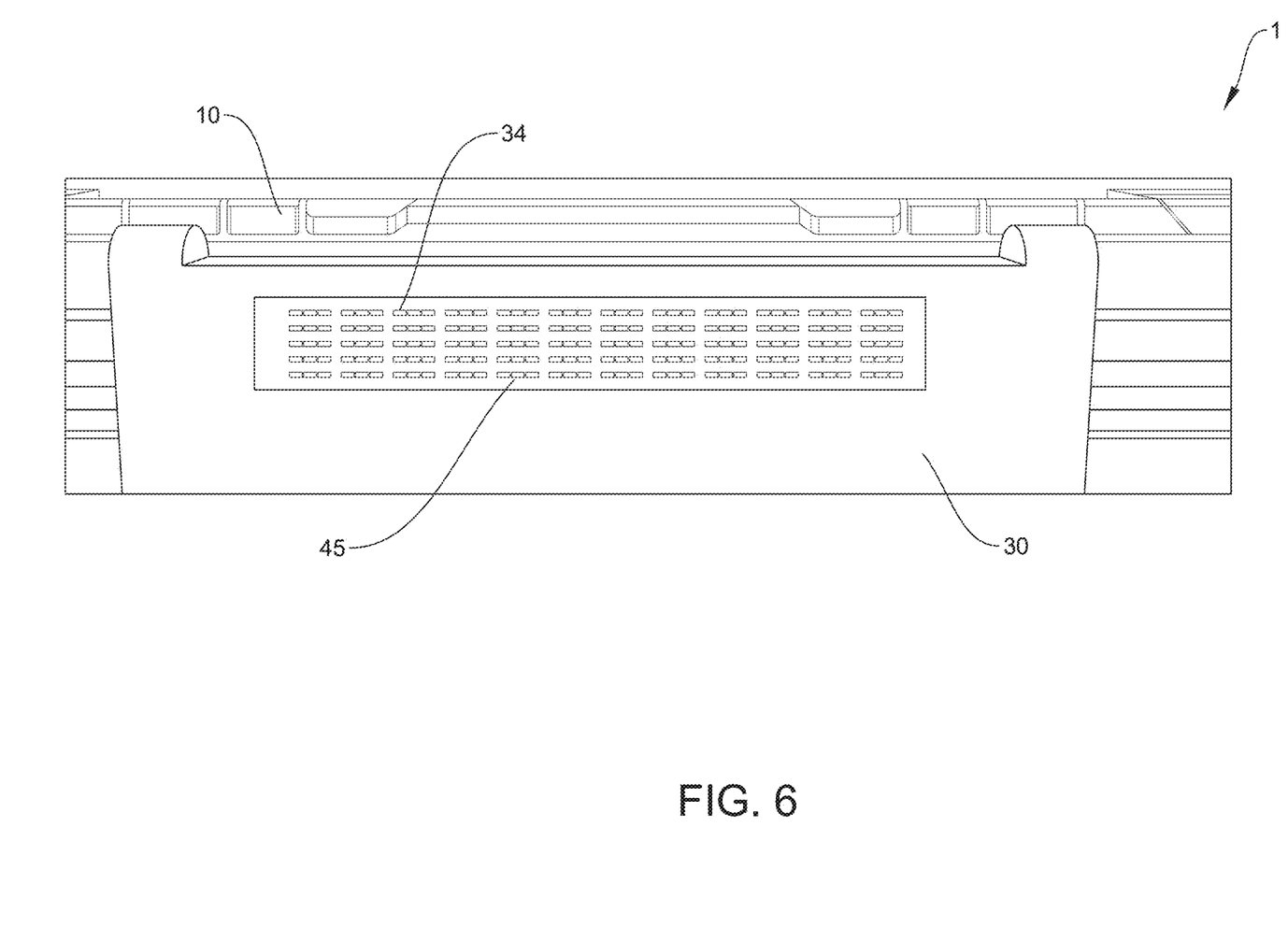
FIG. 6 shows a further embodiment of a display system.

FIG. 6 shows a further embodiment of the display device 34, constructed according to the principles of the disclosure. The display device 34 can include a matrix display 45 that includes a plurality of cells, any of which can be marked to create a letter or word, using for example, a marker or paint. In the example shown in FIG. 6, the matrix display has four (4) rows of thirty-three (33) cells each, a subset of which are marked to display "FLIES," thereby identifying the contents as including fishing flies. Each cell can include a writeable/erasable surface or an electronic display device (not shown) that can be ON or OFF. The matrix display can include fewer or more than four rows and fewer or more than thirty-three cells per row. The cells can be arranged in patterns other than rows or columns, such as, for example, along diagonals or in circles.

Figure 7:
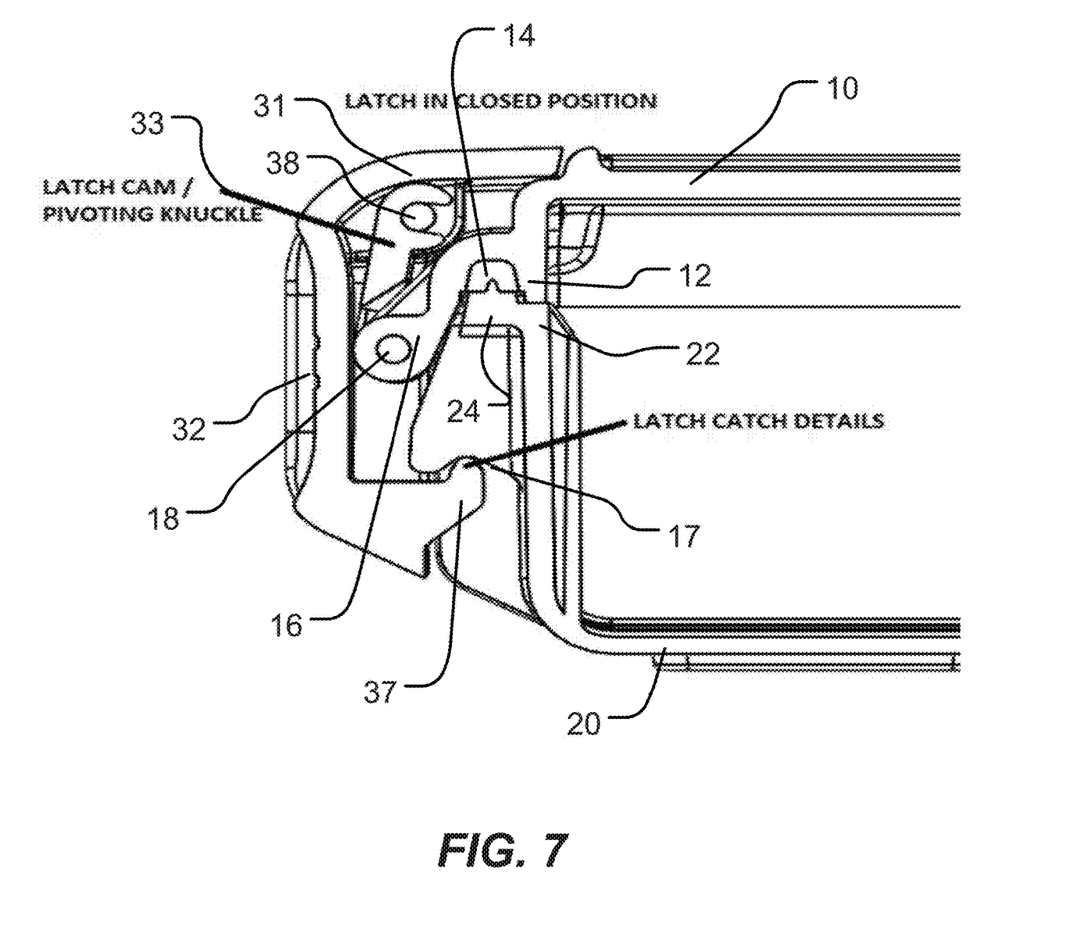
FIGS. 7-12 show views of a cross-section cut view of the latch system in FIG. 2 in a variety of positions, including open and closed positions.

FIGS. 7-12 show views of a cross-section cut view of the latch device 30 in a variety of positions, including an open and a closed position. FIG. 7 shows the latch device 30 in closed position. In addition to the latch cover 31 and latch 37, the latch device 30 can include a knuckle member 33 and a latch cam 38. The latch device 30 can include a box member 16 and a box cam 18. The box member 16 can be formed integrally with the top 10 of the utility box 1. The knuckle member 33 can be pivotally connected at one end to an end portion of the box member 16 by means of the box cam 18. The knuckle member 33 can be pivotally connected at another, opposite end to the latch cam 38. The latch cam 38 can be affixed to or formed integrally with the latch cover 31. The latch cover 31, latch 37 and latch cam 38 can be made as a single piece. The top 10 and the box member 16 can be made as a single piece. The base 20 can include a latch catch 17 that can contact and engage the latch 37 to lock the latch device 30 in the closed position.

According to a non-limiting embodiment, the box cam 18 or latch cam 38 can be replaced by, for example, a hinge, a living hinge or any other structure that can permit the knuckle member 33 to pivot with respect to the latch cover 31 or box member 16.

According to a non-limiting embodiment, the latch device 30 can be connected to the base 20 and configured to engage and lock to the top 10. In this example, the top 10 can include a latch catch 17 and the latch 37 would engage and secure to the latch catch 17 formed in the top 10.

Referring to FIG. 7, the utility box 1 can be configured to form a channel 14 when in the closed position. The channel 14 can include a seal (not shown) to provide an airtight or watertight seal. The top 10 can include a lip 12 that contacts and rests atop a wall portion 22 of the base 20 when in the closed position.

Figure 8:
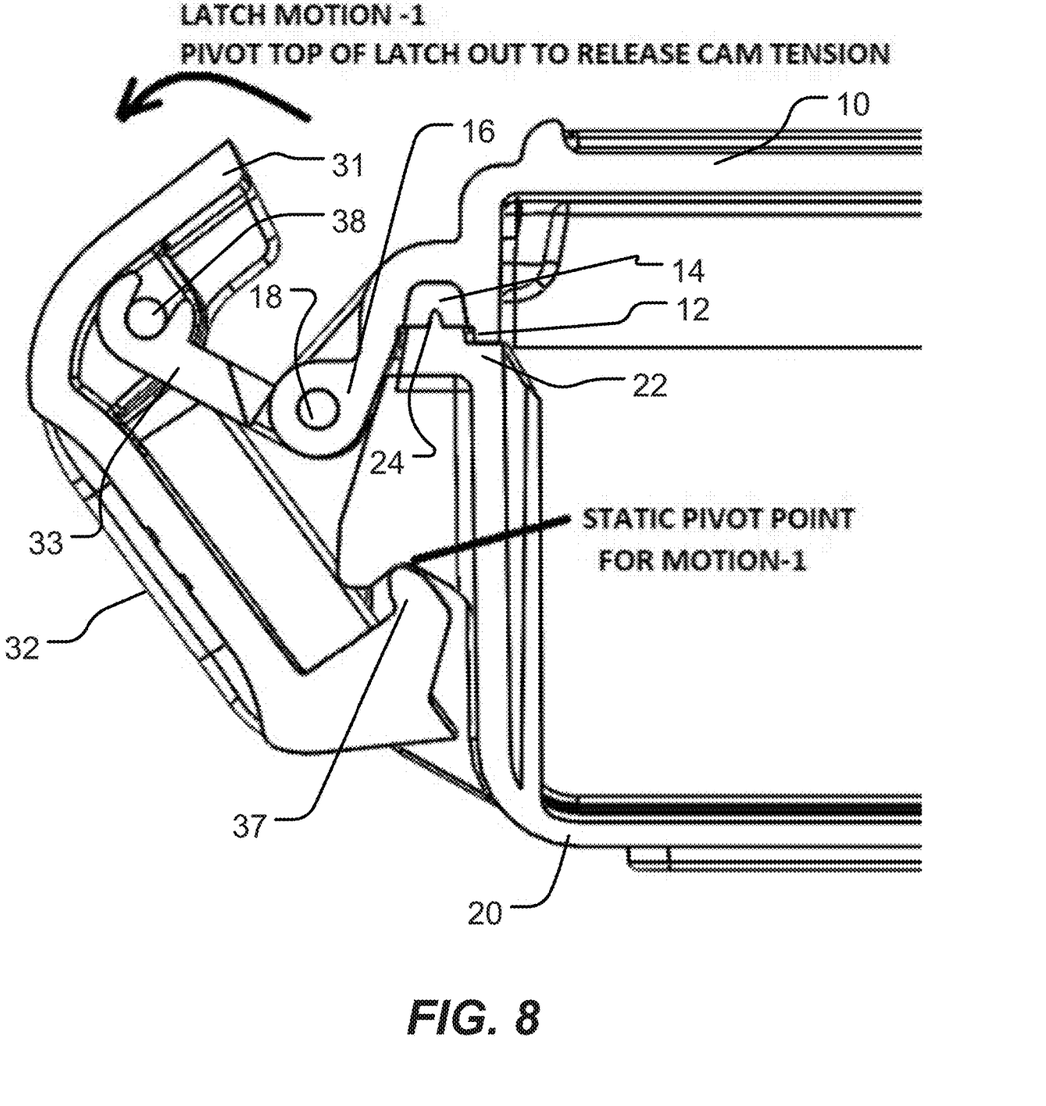
Figure 9:
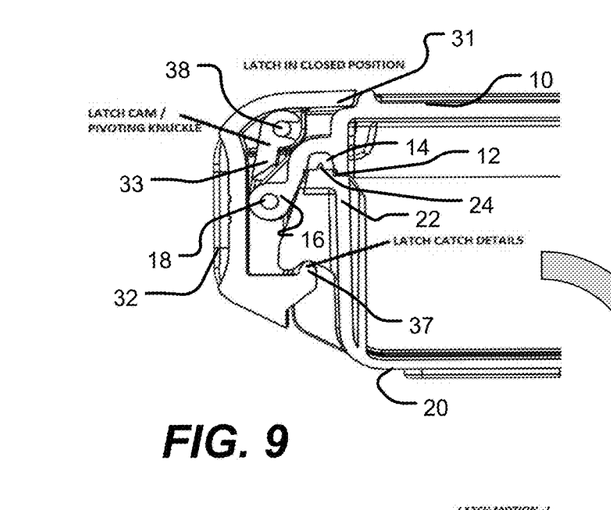

FIG. 8 shows an example of the latch device 30 after the latch cover 31 is moved away from the top 10 to release the latch device 30, but before the latch 37 is released from the latch catch 17 in the base 20.

Figure 10:
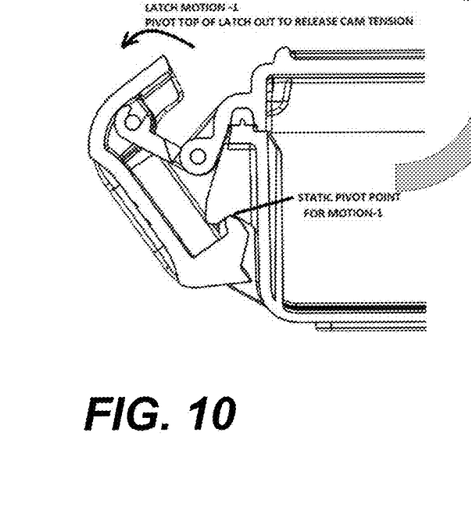
Figure 11:
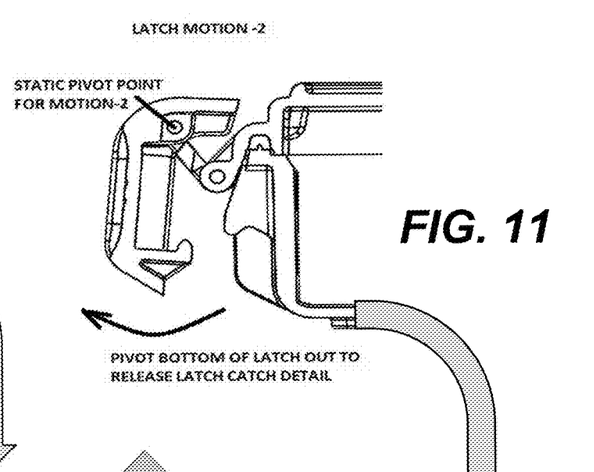
Figure 12:
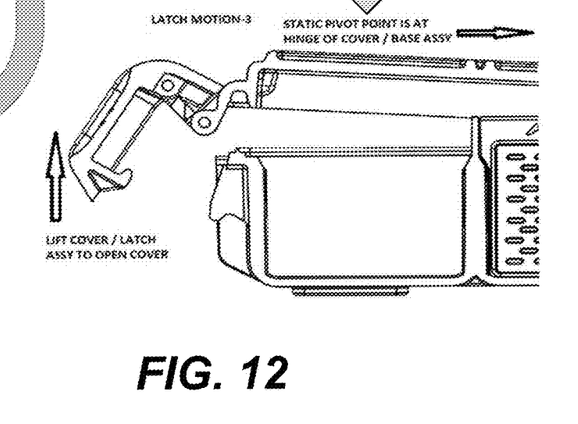

FIGS. 9 to 12 show a three-step process that can be carried using a single hand to unlatch, release and open the top 10 by means of the latch device 30, or to close the top 10 by reversing the order of steps. Beginning in FIG. 9, a user can grasp an upper portion of the latch cover 31 with one hand, pull the latch cover 31 away and down from the top 10 (as shown in FIG. 10), release the latch 37 from the latch catch 17 in the base 20 by pulling the bottom portion of the latch cover 31 away from the base 20, and, finally, pulling the latch system 31 up with the top 10 to open the top 10, as seen in FIG. 12. The entire three-step process can be done as a continuous sequence of steps using a single hand, without having to let go of the latch device 30 at any point in the process. The latch device 30 can be closed by carrying out the three-step process in reverse order.

Figure 13:
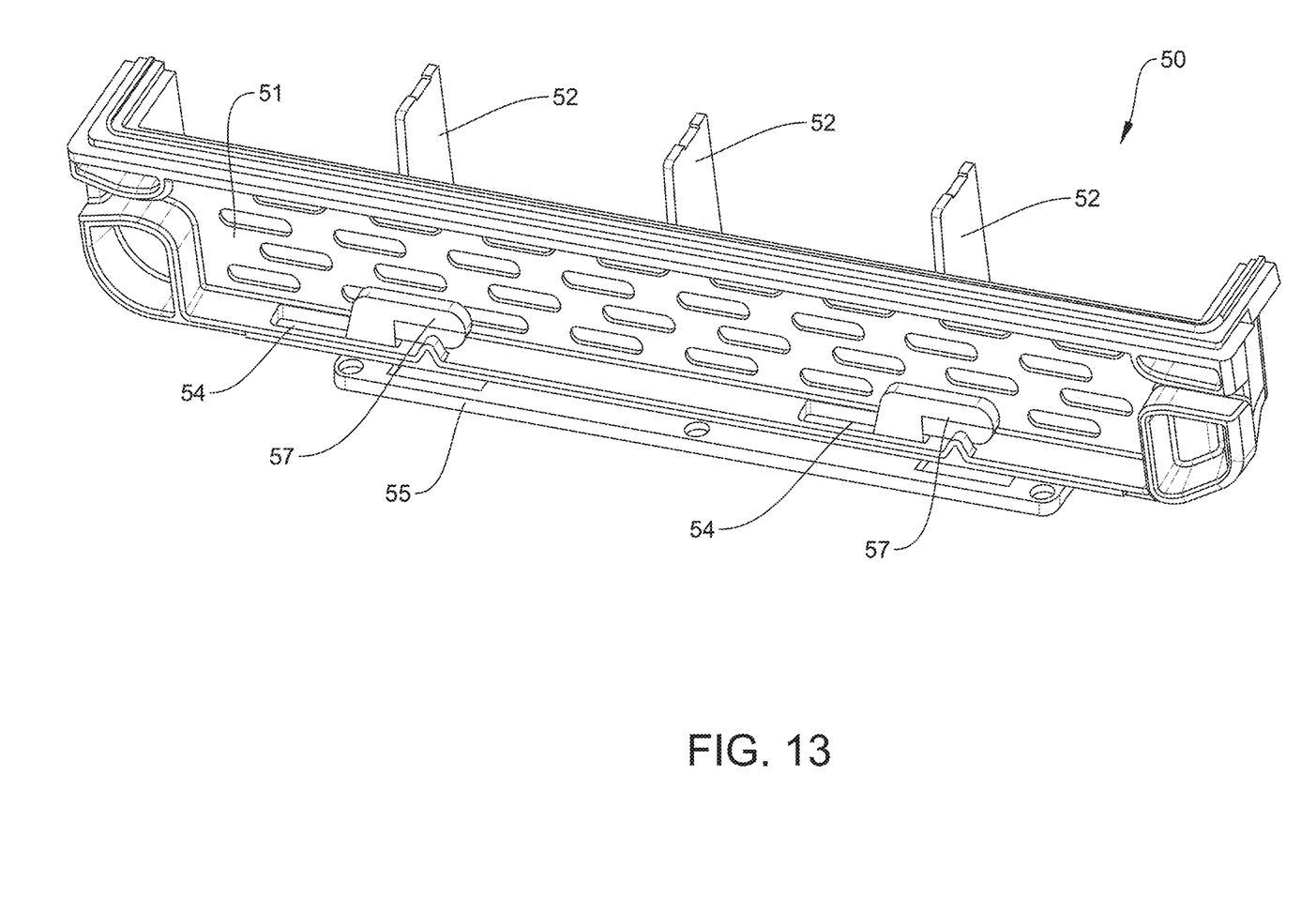
FIG. 13 shows an embodiment of a rack system and a partial view of another embodiment of a utility box.
Figure 18:
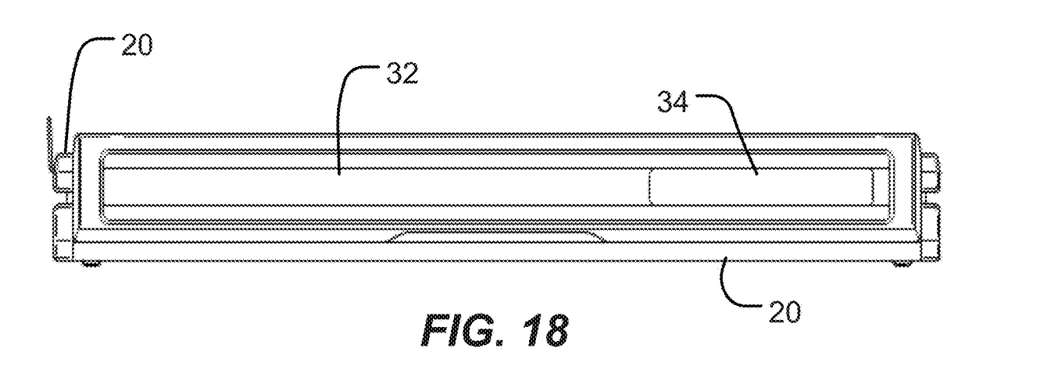

FIG. 13 shows a partial view of another non-limiting embodiment of a utility box 3 provided with an embodiment of a rack system 50, both of which are constructed according to the principles of the disclosure. FIGS. 14-18 show various views of the utility box 3, including a left-front-bottom perspective view (FIG. 14), a top view (FIG. 15), a bottom view (FIG. 16), a side view (FIG. 17) and a front view (FIG. 18). The utility box 3 can include the latch device 30 (for example, shown in FIG. 2-3 or 7-12). The utility box can include the display 34 (for example, shown in FIGS. 2-6).

Figure 14:
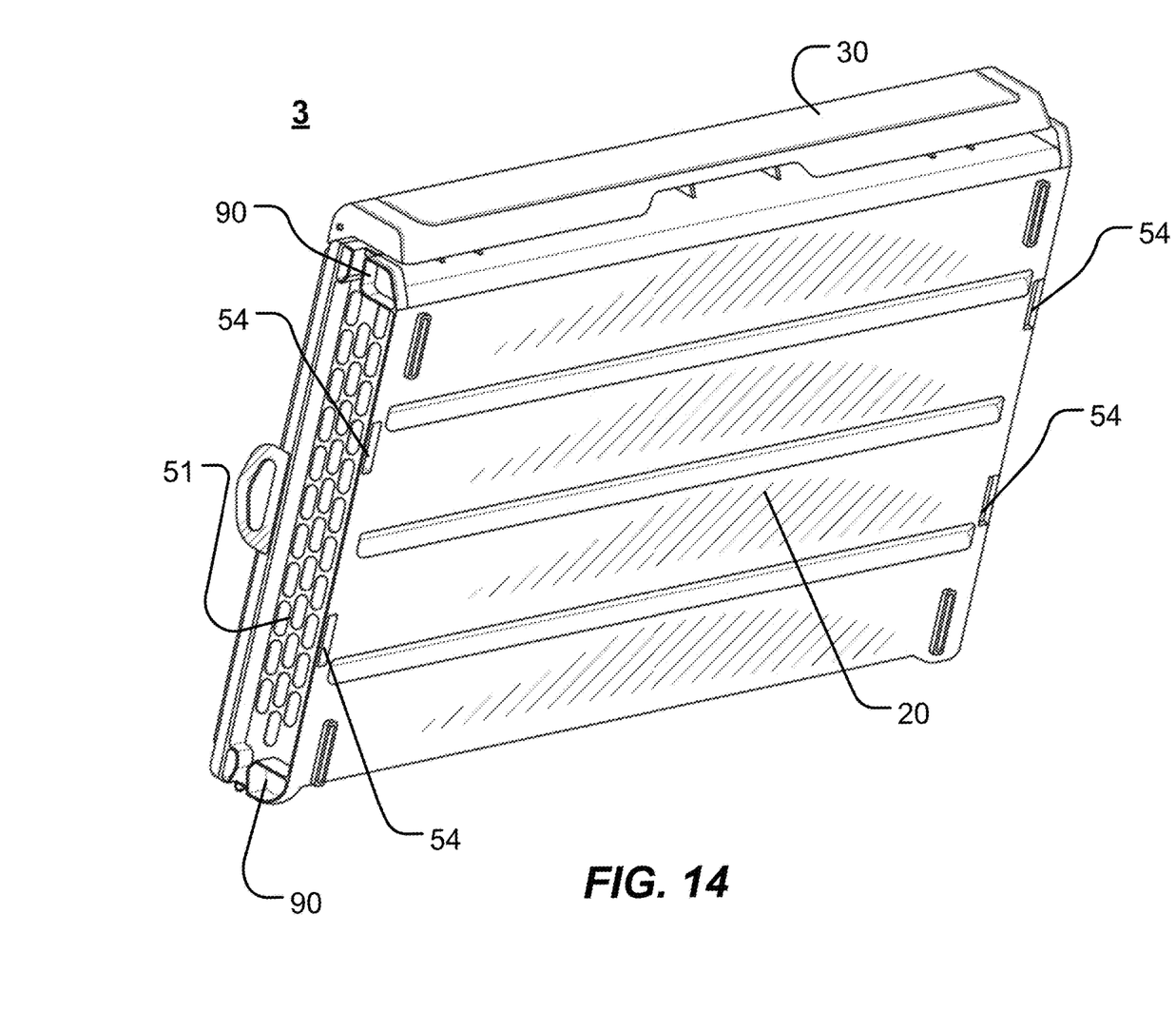
FIG. 14 shows a perspective side-bottom view of the utility box in FIG. 13.
Figure 15:
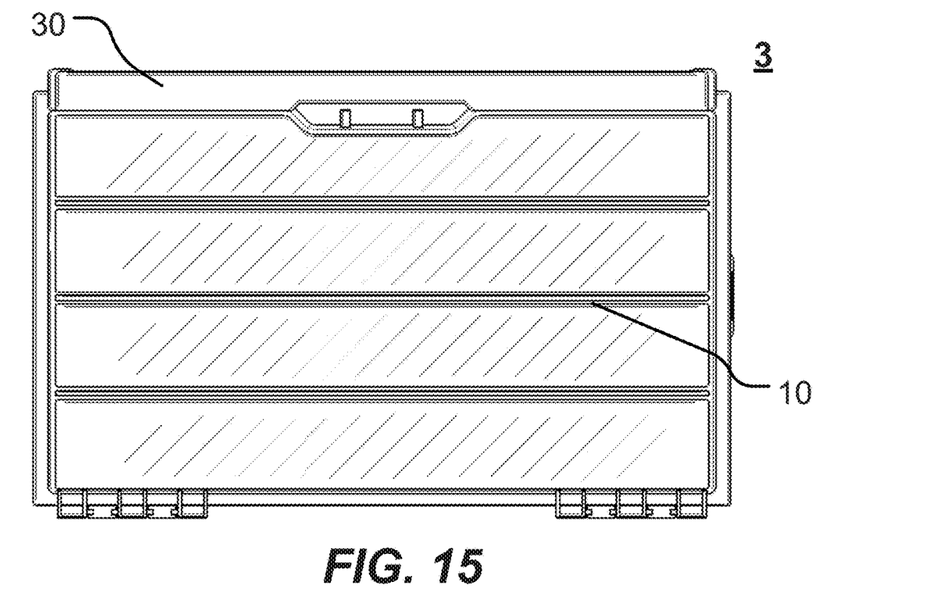
FIGS. 15 and 16 show top and bottom views, respectively, of the utility box in FIGS. 13 and 14.
Figure 16:
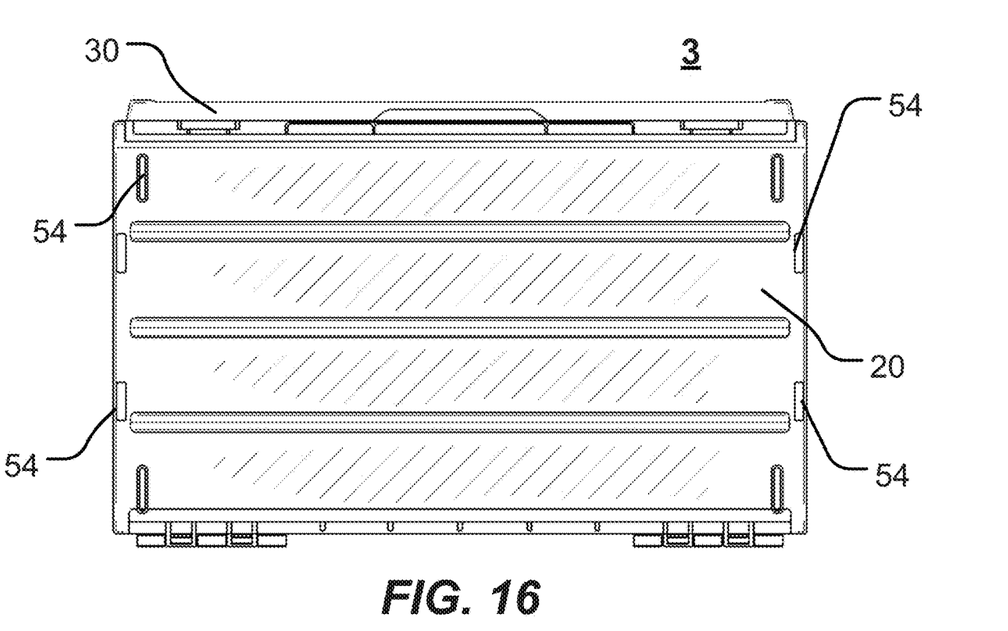
Figure 17:
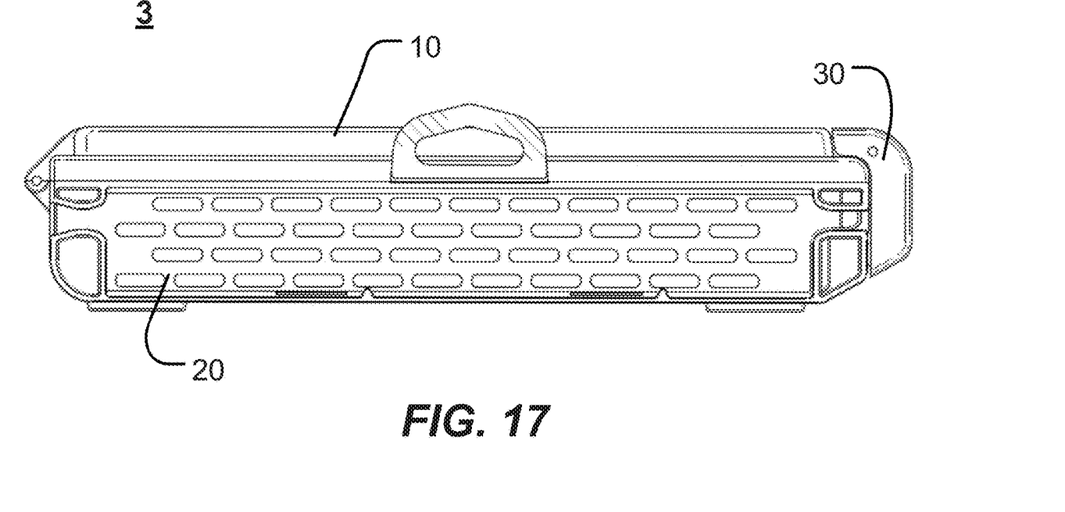
FIGS. 17 and 18 show side and front views, respectively, of the utility box in FIGS. 13 and 14.

Referring to FIGS. 13 and 14, the rack system 50 can include a rail feature 54 and a rack base 55. The rack base 55 can include a box catch 57. In the example shown in FIG. 14, the rail system 50 includes a pair of rail features 54 and the rack base 55 includes a corresponding pair of box catches 57, each of which can engage a corresponding rail feature 54 to lock the rack base 55 to an attachment body 51.

The attachment body 51 can be a portion of the top 10 or base 20 of the utility box 3, such as, for example, the portion of base 20 shown in FIG. 13. The attachment body 51 can include a plurality of ribs 52, which can form part of a body wall of the base 20 of the utility box 3. Alternatively, the ribs 52 can form part of a body wall of the top 10 of the utility box 3. As seen in FIG. 14, the attachment body 51 can include an attachment portion 90 that can facilitate installing the utility box in a rack system or coupling two or more utility boxes to each other.

The utility box 3 can include at least one attachment portion 90 on each side wall of the utility box 3. The attachment portion(s) 90 on the right side wall (not shown) of the utility box 3 can include a male member (not shown), which can be arranged to insert into or otherwise engage a corresponding female attachment portion 90 (shown in FIGS. 13 and 14) on the left side wall of another utility box 3.

The box catch 57 can be made to have any size, shape, or configuration suitable for a particular application. In one non-limiting example, the box catch 57 includes a bayonet shape (shown in FIG. 13) that can pass through the corresponding rail feature 54 and engage the attachment body 51 by, for example, being moved in the direction of a bayonet head portion.

The rack base 55 can be attached to any surface, including, for example, utility box, a tackle box, a tackle bag, a boat surface, a truck-bed surface, or any other surface. For instance, a first pair of rack bases 55 can be attached to a boat surface so that the utility box 3 having a pair of sets of corresponding rail features 54 can be secured to the boat surface via the rack bases 55. The utility box 3 can be secured to the rack bases 55 and, thereby, the boat surface (not shown) by, for example, aligning the utility box 3 with the rail features 54 so that all four rail features 54 are aligned with the corresponding four box catches 57 in the pair of rack bases 55, and lowering the utility box 3 so that the box catches 57 pass through the rail features 54 and, then, pushing or pulling the utility box 1 backward (or forward or sideways) so the box catches 57 engage and lock to the base 20 (or the top 10) of the utility box 1. The process can be carried out repeatedly with additional utility boxes that are equipped with the rack system 50, thereby allowing a user to stack the utility boxes 3 vertically, one atop of another, or one next to another horizontally. The utility box 3 can be released by pushing or pulling in the opposite direction.

Although shown as having two box catches 57, the rail base 55 can have one or more than two box catches 57. Furthermore, the rail base 55 can be affixed to or formed integrally with the utility box 3 and the rail features 54 can be formed in a mounting surface (not shown), or formed in a structure such as, for example, a bar or a strip (not shown) that can be affixed to the mounting surface.

The utility box 3 can include fewer than four rail features 54, or more than four rail features 54. The utility box 3 can include one or more rack bases 55 formed integrally with or attached to the top 10 or base 20.

The terms "a," "an," and "the," as used in this disclosure, means "one or more," unless expressly specified otherwise.

The terms "including," "comprising," and variations thereof, as used in this disclosure, mean "including, but not limited to," unless expressly specified otherwise.

Although process steps, method steps, or the like, may be described in a sequential order, such processes and methods can be configured to work in alternate orders. In other words, any sequence or order of steps that may be described does not necessarily indicate a requirement that the steps be performed in that order. The steps of the processes or methods described herein can be performed in any order practical. Further, some steps can be performed simultaneously.

When a single structure or article is described herein, it will be readily apparent that more than one device or article may be used in place of a single device or article. Similarly, where more than one device or article is described herein, it will be readily apparent that a single structure or article may be used in place of the more than one structure or article. The functionality or the features of a structure or article may be alternatively embodied by one or more other structures or articles that are not explicitly described as having such functionality or feature.

While the disclosure has been described in terms of exemplary embodiments, those skilled in the art will recognize that the disclosure can be practiced with modifications in the spirit and scope of the instant disclosure. These examples given above are merely illustrative and are not meant to be an exhaustive list of all possible designs, embodiments, applications or modifications of the disclosure.

What is claimed is:

1. A utility box, comprising:
    an axis about which the utility box opens;
    a top;
    a base;
    a latch catch;
    a latch device having a latch cover that is connected to the top or the base and configured to engage the latch catch and lock the utility box from an open position to a closed position in two stages of operation, the latch device defining an aperture;
    a display device comprising:
        a first side comprising a display configured to identify the utility box; and
        a second side opposite the first side and adjacent to the latch cover, the second side comprising a stem portion;
    wherein the aperture of the latch device receives the stem portion to secure the display device to the latch cover;
    wherein the display comprises a substantially flat surface having a first edge and a second edge;
    wherein when the utility box is in the closed position, the first edge is oriented generally parallel to the axis and the second edge is oriented generally perpendicular to the axis; and
    wherein the first edge is longer than the second edge.

2. The utility box in claim 1, wherein the latch cover includes a latch that engages the latch catch to lock the utility box in the closed position.

3. The utility box in claim 2, wherein the latch device comprises a knuckle member having a first end that connects pivotally to the latch cover.

4. The utility box in claim 3, wherein the knuckle member has a second end that connects pivotally to the top or the base.

5. The utility box in claim 1, wherein the display device comprises an overmold formed in the latch cover.

6. The utility box in claim 1 further comprising a rack system that attaches to a surface to secure the utility box to the surface, wherein the surface is a top surface or a bottom surface of another utility box.

7. The utility box in claim 6, wherein the rack system comprises a rack base that attaches to the surface or the utility box.

8. The utility box in claim 7, wherein the rack base comprises a box catch.

9. The utility box in claim 6, wherein the rack system comprises a rail feature that is formed in the utility box.

10. The utility box in claim 9, wherein the rail feature is formed in one of the base or the top.

11. The utility box in claim 8, wherein the rack system comprises a rail feature that engages the box catch to secure the utility box to the rack base.

* * * * *